Dec. 30, 1952            J. C. NELSON            2,623,762
ACCOUNTING APPARATUS
Filed Oct. 17, 1950                      2 SHEETS—SHEET 1
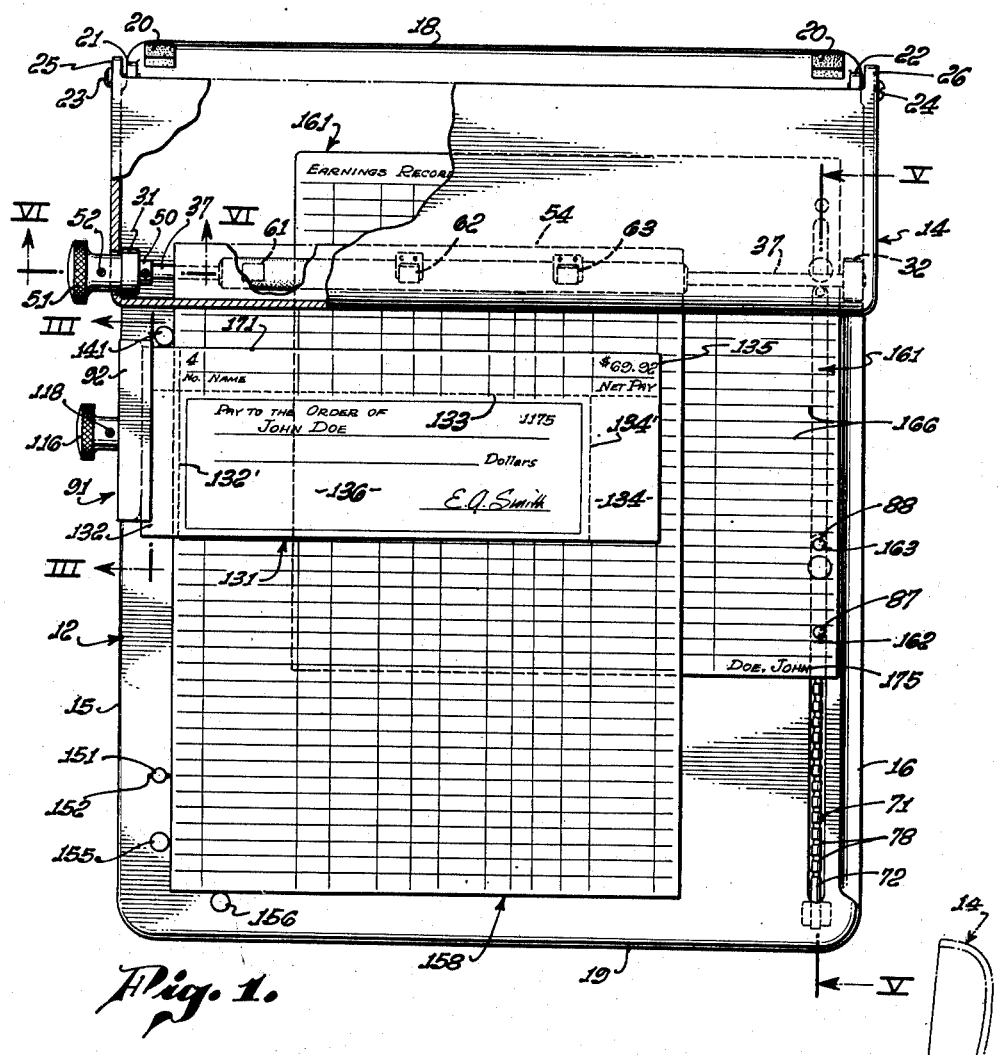
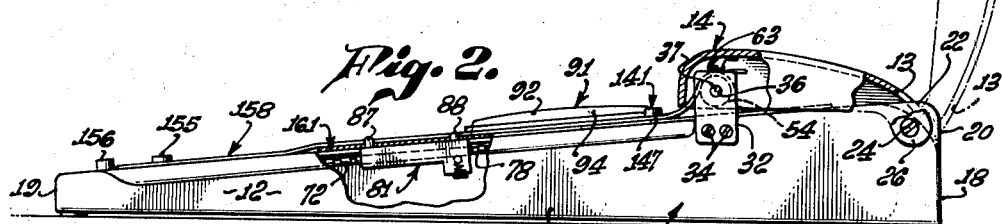
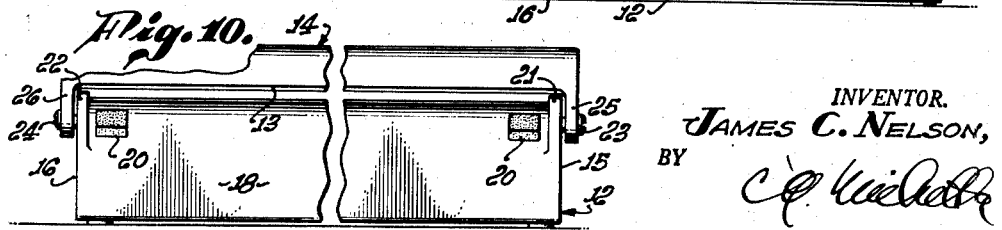
INVENTOR.
JAMES C. NELSON,
BY
ATTORNEY.

Dec. 30, 1952  J. C. NELSON  2,623,762
ACCOUNTING APPARATUS
Filed Oct. 17, 1950
2 SHEETS—SHEET 2
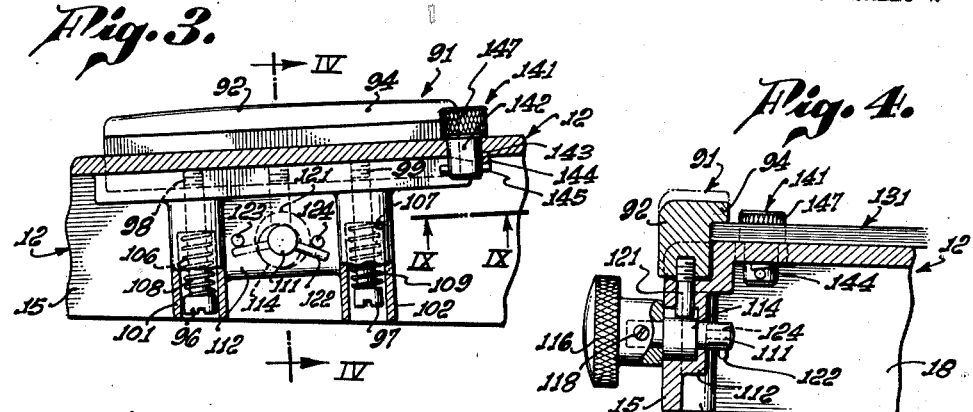
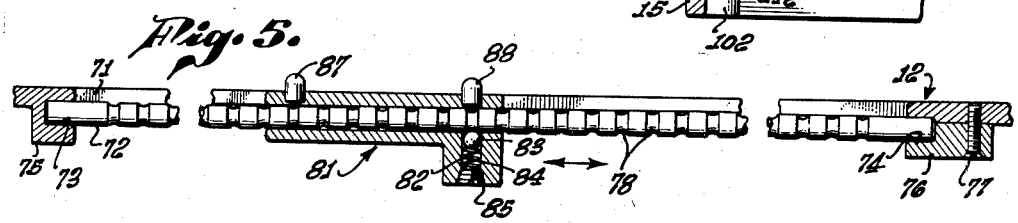
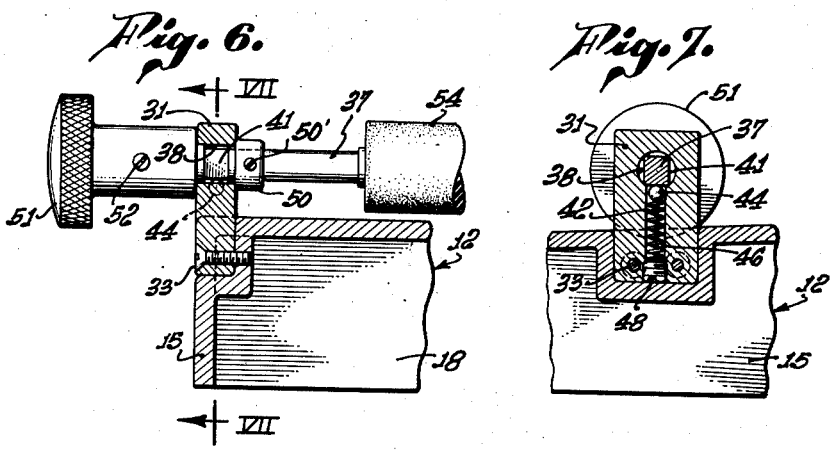
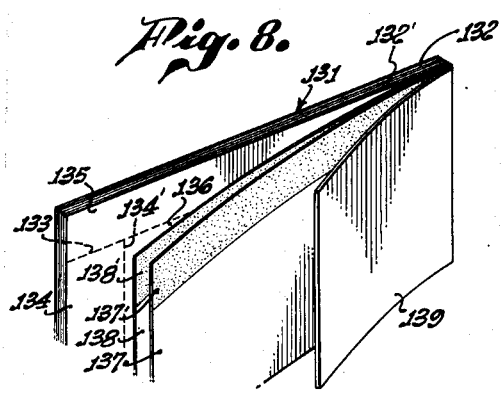
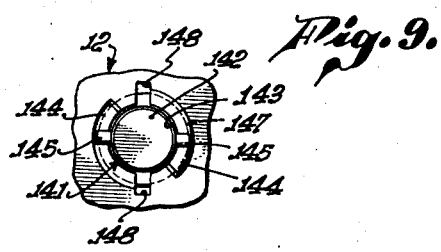
INVENTOR.
JAMES C. NELSON,
BY
ATTORNEY.

Patented Dec. 30, 1952

2,623,762

UNITED STATES PATENT OFFICE 2,623,762

ACCOUNTING APPARATUS

James C. Nelson, San Gabriel, Calif., assignor to Business Systems, Incorporated, Los Angeles, Calif., a corporation of California Application October 17, 1950, Serial No. 190,574

6 Claims. (Cl. 282—29)

This invention relates generally to an apparatus for facilitating the keeping of collated business records and more particularly discloses an apparatus of lighweight portable construction for preparing and keeping business records pertaining to payrolls, accounts receivable, installment sales and the like.

It is well known that in recent years it has become increasingly necessary for business establishments to prepare and maintain relatively complex business records. An outstanding example is illustrated by the payroll records which are required to be kept for each employee; withholding taxes and deductions of many kinds have greatly increased the accounting tasks imposed upon the employer. In large business complex machinery of the automatic or semi-automatic type has been developed to meet this need, but such an installation is necessarily very expensive and can be used efficiently only in establishments having a large number of employees. Smaller businesses in general cannot afford such complex equipment and it is particularly in such establishments that my invention finds its greatest usefulness. Even businesses having a large number of employees are frequently faced with the problem of paying employees or conducting other financial transactions at locations distant from the central office of the business, for instance on construction projects and the like, and in these situations also my invention proves highly useful.

Prevention of errors in business records is of the greatest importance, and when the same entry must be made on several different forms it is necessary to prove each of the several forms unless the entries are made simultaneously, as by a transfer medium such as carbon paper. In the latter case only one proof suffices to check all entries.

Attempts have been made in the past to provide accounting apparatus to meet the above problems, but the devices have been generally unsatisfactory in many respects. Some employ specially prepared forms made up in shingled sets, wherein each individual form in a set is displaced laterally or longitudinally from the adjacent form in the set. By this device, entries made on marginal portions of successive forms are reproduced by carbon paper or the like on successive lines of an underlying journal or ledger sheet. However, such sets of shingled forms are laborious to prepare and expensive to purchase.

Other prior art apparatuses are characterized by projecting members of metal or other rigid material, said members being periodically moved during operation. Such apparatuses occupy a relatively large amount of area on a desk or other supporting surface, and are cumbersome and awkward in use.

Furthermore, from the standpoint of fatigue it is desirable that the operator not be required to shift his writing position appreciably during use of the apparatus. When entries on successive forms may be made in substantially the same writing position, fatigue and consequent errors due thereto are minimized.

My invention provides a solution to the above needs in the form of a novel and efficient device having few moving parts and well adapted for use in many business activities. It has for its principal object the provision of a novel device to facilitate the making of multiple accounting entries on business records.

Another object of my invention is to disclose an apparatus by which errors in accounting entries are minimized.

A further object is to provide a device adapted to use standard accounting forms and hence extremely economical to operate.

A still further object is to disclose such a device of rugged and durable construction and yet easily portable.

A further object is to disclose a device having the above characteristics which is compact, occupying no more space on a desk than a conventional typewriter.

A still further object is to provide such a device which is efficient in design and which can be manufactured comparatively inexpensively.

These and other objects and purposes of my invention will become clear from a study of the following description of an exemplary embodiment thereof taken in connection with the accompanying drawings in which:

Fig. 1 is a top plan view of a preferred embodiment of my invention, with a portion of the hinged cover broken away.

Fig. 2 is a side elevational view of the device with a portion of the hinged cover and side wall broken away, the hinged cover in its open position being shown in dotted outline.

Fig. 3 is a fragmentary sectional view taken on line III—III of Fig. 1.

Fig. 4 is a fragmentary sectional view taken on line IV—IV of Fig. 3.

Fig. 5 is a view taken on line V—V of Fig. 1 showing a preferred form of carrier and carrier rod assembly.

Fig. 6 is a fragmentary sectional view taken on line VI—VI of Fig. 1.

Fig. 7 is a fragmentary sectional view taken on line VII—VII of Fig. 6.

Fig. 8 is a perspective view of a preferred construction of accounting forms used in connection with my invention.

Fig. 9 is a fragmentary view taken on line IX—IX of Fig. 3.

Fig. 10 is a rear elevational view of the device, a portion of the cover being broken away.

My invention includes a base plate 12 preferably rectangular in form and provided with a hinged cover or cover plate 14 overlying the upper portion of base plate 12. In the illustrated embodiment I provide means along one edge of base plate 12, which may be the right edge thereof, for locating a group of accounting forms in one of a plurality of discrete positions. On the opposite side of base plate 12 I provide means for releasably clamping a pad of individually detachable accounting forms which in the present illustration are pay checks. Means are provided for adjustably positioning a third accounting form, said means preferably including resilient frictional idler rollers carried by the hinged cover plate 14 and cooperating when the cover plate is lowered with a manually actuable transverse resilient frictional roller rotatably carried by base plate 12. A transfer medium such as carbon paper or the like is provided by which an entry made upon the marginal portion of a pay check will be reproduced in the proper location on one or more underlying accounting forms.

Referring in detail to the drawings and particularly to Figs. 1 and 2 thereof, a rectangular base plate 12 may be provided with downwardly extending side walls 15 and 16. Downwardly extending rear end wall 18 and front end wall 19 extend transversely beneath base plate 12 and join the side walls 15 and 16. Preferably rear end wall 18 is of somewhat greater height than front end wall 19 in order that base plate 12 may slope downwardly toward the front for greater convenience in use as will be better understood later. At the rear upper end of the side walls there are provided a pair of trunnions 21 and 22 in which are mounted pinions or screws 23 and 24 respectively. Hinged cover plate 14 is provided with a pair of downwardly and rearwardly extending ears 25 and 26 which have openings formed therein rotatably engaging pinions 23 and 24. Thus cover plate 14 may be raised to the position shown in dotted outline in Fig. 2 or may be lowered to the position shown in full lines. Cover plate 14 when in its lowered position overlies only a portion of base plate 12, which may be approximately the upper or rear quarter of the base plate, and, as best appears in Figs. 2 and 10, the rear edge 13 of cover plate 14 is spaced above the plane of base plate 12 whereby accounting forms lying upon base plate 12 may be moved rearwardly as desired during use of the device. I may provide resilient stops 20 carried by rear wall 18 on which edge 13 of cover plate 14 may rest when the cover plate is in raised position.

A pair of upstanding brackets 31 and 32 are attached to the side walls 15 and 16 respectively by suitable means such as screws 33 and 34. Bracket 32 attached to the right side wall is provided with an opening 38 in which a roller shaft 37 is journalled. The bracket 31 attached to left side wall 15, seen in greater detail in Figs. 6 and 7, includes means for yieldably retaining shaft 37 at a selected one of a plurality of positions. Shaft 37 is provided with a portion 41 of polygonal cross section where the shaft is journalled in bracket 31. As best appears in Fig. 7, bracket 31 includes a channel 42 extending downwardly from opening 39 formed in bracket 31. Within channel 42 a ball 44 and a compression member 46 are maintained in position by suitable retaining means, such as set screw 48 threadedly received in the lower end of channel 42. Manually operable means, such as knob 51, is connected to the outer end of rectilinear portion 41 of shaft 37, being held thereon as by set screw 52. A collar 50 with threaded set screw 50' is carried upon shaft 37 and slidably abuts the inner face of bracket 31 in order to properly position shaft 37 relative to base plate 12.

It will now be understood that manual rotation of knob 51 will rotate shaft 37 and resilient frictional roller 54 carried on the shaft, and the shaft will assume any one of a number of discrete positions. In the present illustration, shaft 37 will assume any one of four positions, since ball 44 forced against the rectilinear sides of portion 41 will urge the shaft into the position shown in Fig. 7 wherein ball 44 rests centrally on one of said rectilinear sides. Cover plate 14 is provided on its lower surface with rotatably mounted resilient idler rollers 61, 62 and 63, and when cover plate 14 is in its lowered position idler rollers 61, 62 and 63 frictionally engage resilient roller 54 carried on shaft 37. As will be later described in detail, accounting form 158 is frictionally gripped between roller 54 beneath and idler rollers 61, 62 and 63 above, whereby rotation of knob 51 advances form 158 rearwardly by spaced discrete steps.

A longitudinally extending channel 71 is formed in base plate 12 adjacent one edge thereof. Immediately beneath channel 71 there is provided a carrier rod 72 extending the entire length of channel 71. The carrier rod is received in recesses 73 and 74 formed in bosses 75 and 76 on the under surface of base plate 12. One of the bosses, as 76, may be removably attached to base plate 12 by threaded screw 77. Carrier rod 72 is provided with a plurality of circumferential indentations 78. A carrier indicated generally at 81 includes a downwardly extending channel 82 having disposed therein a spherical member 83, a compression member 84 and a retaining means, such as set screw 85. It will be seen that carrier 81 may be moved along carrier rod 72 and will seek to come to rest along said rod at any point where spherical member 83 engages one of the indentations 78. Carrier 81 is provided on its upper surface with registering means such as dowel pins 87 and 88 which extend upwardly through channel 71 and well above the upper surface of base plate 12.

On the side of base plate 12 opposite channel 71 is provided a releasable retainer or clamping means indicated generally at 91. Clamping means 91 includes a clamp bar 92 provided with an inwardly extending lip 94 (see Fig. 4). Clamp bar 92 is provided with a pair of downwardly extending screws 96 and 97 threadedly received in recesses 98 and 99 respectively formed in clamping bar 92. A pair of apertured bosses 101 and 102 are provided in side wall 15. The apertures in said bosses receive the shanks of screws 96 and 97 and are provided with enlarged portions 106 and 107 for receiving compression members 108 and 109. Thus clamping bar 92 is urged downwardly by the force of compression members 108 and 109 bearing against the annular portions of apertures 106 and 107 and the heads of screws 96 and 97.

A shaft 111 is rotatably journalled in boss 112 of side wall 15 and is provided with an eccentric portion 114. A knob 116 is attached to shaft 111 and is retained thereon as by set screw 118. A follower rod 121 is threadedly received in clamping bar 92 and its lower end rests upon eccentric portion 114 of shaft 111. Manual rotation of shaft 111 by means of knob 116 causes follower rod 121 to rise or fall on eccentric 114 and thus to raise or lower clamping bar 92. The inner end of shaft 111 may be provided with a radially extending pin 122, and a pair of stop members 123 and 124 project inwardly from side wall 15 into the plane of movement of pin 122. Thus shaft 111 is permitted only a limited rotation, the extent of said rotation being indicated by two positions of pin 122 as shown in Fig. 3. It will be evident that the rotation of knob 116 which moves pin 122 into the position shown in full lines in Fig. 3 allows compression members 108 and 109 to urge clamping bar 92 downwardly, whereby lip 94 will securely grip one edge of a pad or set of accounting forms indicated generally at 131 in position upon base plate 12. Rotation of knob 116 in the opposite direction, so that pin 122 assumes the position shown in dotted outline in Fig. 3, causes eccentric 114 to raise follower rod 121 and clamping bar 92 against the force of compression members 108 and 109, thus releasing accounting forms 131.

In order to properly position the pad of accounting forms 131 longitudinally upon base plate 12 I may provide a dowel pin 141 adjacent retainer 91. Said pin 141 is provided with a circular shank 142 received in an aperture 143 formed in base plate 12. A pair of arcuate wedges 144 (see Fig. 4) are formed on the lower surface of base plate 12 and cooperate with a pair of projecting pins 145 formed at the lower end of shank 142. The upper end of dowel pin 141 is provided with an enlarged head 147, preferably knurled as shown. A pair of radial slots 148 extend outwardly from aperture 143 in base plate 12, and allow dowel pin 141 to be inserted or withdrawn when radial pins 145 register with slots 148. As best appears in Fig. 4, dowel pin 141 after being inserted in aperture 143 may be manually rotated approximately one-eighth of a turn, whereby radial pins 145 are slidably wedged against arcuate surfaces 144. Dowel pin 141 will thus be retained in position against accidental dislodgement during use of the device. I may also provide an aperture 151 formed in base plate 12 adjacent an edge thereof having radially directed slots 152 for receiving dowel pin 141 when said dowel pin is not needed for positioning accounting forms. It will be seen that pad 131 is accurately positioned transversely of base plate 12 by contact of pad 131 against the inner face of clamping bar 92 beneath lip 94.

Additional positioning means may be provided adjacent the front edge of base plate 12 in the form of upstanding bosses 155 and 156. An accounting form 158 may thereby be positioned accurately upon base plate 12, being placed in contact with dowel pin 141 and upstanding bosses 155 and 156.

In the present illustration it is assumed that three simultaneous records are to be made of an employee's pay account. Conventionally an accounting form is established for each employee whereon such items as "Total Earnings," "Withholding Tax," "Social Security Deductions" and the like may be entered for each pay period. Such a form, hereinafter referred to as an "Earnings Record," is indicated generally at 161 and includes apertures 162 and 163 adapted to register with dowel pins 87 and 88 respectively. Accounting form 158 may be a "Payroll Journal" on which the same numerical entries made on form 161 are to be entered. Payroll Journal 158 is provided with spaced columnar rulings as shown, said rulings being arranged to register with corresponding columnar rulings borne by Earnings Record 161.

The third simultaneous accounting record to be made is that provided upon a marginal detachable portion of the pay check itself. Each check is provided with perforations by which portions may be manually detached from the check before negotiating it. Said perforations may include a perforated line 132' by which an individual check may be detached from portion 132 gripped by clamping means 91. A transverse perforated line 133 is provided to permit the payee to detach and retain remittance stub 135 prior to negotiating the check proper 136; a third perforated line 134' permits the detaching of stub 134, which may contain printed instructions to the payee regarding the desirability of retaining remittance stub 135. Remittance stub 135 is provided with spaced columnar rulings corresponding to those on Earnings Record 161 and Payroll Journal 158. As best appears in Fig. 8 accounting forms 131 are preferably assembled as by adhesive into a pad or set including, say, 25 forms. Immediately beneath the lowermost accounting form 131 there are two sheets 137 and 138, each having its respective upper portion 137' and 138' provided with a transfer medium such as conventional carbon paper. It is to be noted that the carbonized strips underlie only remittance stubs 135, and do not extend beneath checks proper 136. For convenience in handling the pad of accounting forms 131, I may also provide in the pad a backing strip 139 underlying sheets 137 and 138.

In the use of my device for facilitating the paying of employees, the Earnings Records 161 of employees to be paid are mounted upon carrier 81, dowel pins 87 and 88 accurately positioning Earnings Records 161 as heretofore described. It will be understood that successive horizontal lines 166 of Earnings Records 161 indicate sequential pay periods which in the present illustration may be assumed to be a week. Carrier 81 is therefore positioned along carrier rod 72 so that the correct horizontal line 166 is positioned beneath the ruled entry blanks of remittance stub 135. As will be evident the position of carrier 81 and Earnings Records 161 carried thereby will not be changed during the paying of employees for any given pay period. I prefer to mount the same number of Earnings Records 161 upon carrier 81 as the number of checks 136 assembled in pad 131, in the present illustration 25. As appears in Fig. 2, transverse, resilient roller 54 is spaced above base plate 12 so that Earnings Records 161 may be moved rearwardly or frontwardly on base plate 12 passing beneath and not contacting resilient roller 54. Earnings Records 161 may be moved rearwardly as far as permitted by carrier 81, since rear edge 13 of hinged cover plate 14 is spaced above base plate 12.

Carrier 81 and Earnings Records 161 having been correctly located, the pad 131 of checks is clamped by clamping means 91. Backing strip 139 is positioned on base plate 12 beneath Earnings Records 161, and sheet 137 is laid above the Earnings Records. All other elements of pad 131 are loosely folded leftwardly over clamping means 91. The cover plate 14 is moved to its raised position shown in dotted outline in Fig. 2. Payroll Journal 158 is then positioned upon base plate 12 by contacting dowel pin 141 and upstanding bosses 155 and 156 as previously described. The position of boss 156 is accurately correlated with the horizontal rulings of Payroll Journal 158 so that those rulings will exactly register with horizontal rulings 166 of Earnings Record 161 when carrier 81 engages one of the circumferential indentations 78 on carrier rod 72. The upper marginal portion of Payroll Journal 158 is placed upon resilient roller 54 as best appears in Fig. 2, and when cover plate 14 is moved to its lowered position as shown in full lines in Fig. 2, resilient idler rollers 61, 62 and 63 cooperate with roller 54 in frictionally gripping the upper marginal portion of Payroll Journal 158. Thus manual rotation of knob 51 moves Payroll Journal 158 upwardly. The spacing mechanism previously described in connection with Figs. 6 and 7 is arranged to move Payroll Journal 158 exactly a distance equal to the spacing between adjacent horizontal rulings 166 on Earnings Record 161.

The Payroll Journal 158 having been correctly positioned, sheet 138 and the adjacent check 136 are folded rightwardly so that they overlie a portion of the Payroll Journal. The remaining checks in pad 131 remain loosely folded leftwardly away from base plate 12.

When filling in a pay check for issue to an employee, the employee's name is written in the space 171 on remittance stub 135. Hours worked, total earnings, deductions of various sorts, net pay and other appropriate notations are entered in the correct portions of remittance stub 135 on the same line as the name space 171 and it will be seen that all entries made upon said stub 135 will be duplicated by means of carbonized strip 138' upon Payroll Journal 158. Furthermore, all entries made upon the remittance stub except the name of the employee entered in space 171 will likewise be transferred onto Earnings Record 161 by means of carbonized strip 137'. It is, of course, not necessary for the employee's name to be duplicated upon Earnings Record 161, since each of said Earnings Records 161 is for an individual employee, whose name appears as at 175 on the Earnings Record. Then, after completing the pay check and detaching it together with its remittance stub 135 along perforated line 132', the uppermost Earnings Record 161 is removed from carrier 81 and placed to one side. It is to be noted that removal of the uppermost individual Earnings Record 161 may be accomplished without disturbing the setting of Payroll Journal 158, since the Earnings Record to be removed may be slid frontwardly and to the right after being detached from dowel pins 87 and 88 of carrier 81. Rotation of knob 51 through one interval (in the present instance, a quarter turn) will then position Payroll Journal 158 correctly for the next remittance stub 135 and pay check to be made out. Said next check is moved into position overlying sheet 138 the remaining unused checks being left loosely folded as previously described. Thus the checks in set or pad 131 are used in a sequence the reverse of the conventional use of a pad of checks. That is, the check adjacent lower sheet 138 is the first check to be used in the pad. The individual checks above the lowermost check in the pad are folded leftwardly over clamping means 91 until later use of each check in sequence.

When pre-numbered checks are used and it is desired to issue them in the sequence corresponding to their numbers, the check bearing the smallest number is the check next to sheet 138. In the present illustration wherein pad 131 includes 25 checks, let it be assumed that the checks are pre-printed to bear the Numbers 1151 to 1175 inclusive. Check Number 1151 is then the lowermost check in the pad or set 131, and is therefore the check closest to the observer in viewing Fig. 8. It will now be understood that the situation depicted in Fig. 1 may represent either the apparatus and forms before any checks have been filled in and before the checks have been loosely folded leftwardly as previously described, or the situation existing after the first twenty-four checks of pad 131 have been issued and the last check, Number 1175, is ready to be filled in and issued.

Thus I have provided a device for simultaneously making entries on the three fundamental forms necessary in maintaining payroll accounts for employees. Only one proof of an entry is necessary since transfer medium insures that all entries on the several forms are identical. Although I have described my device in detail in connection with its use for completing payroll records, it will be immediately evident to those skilled in the art that the device is admirably adapted to be used in many other business activities. For instance, in the case of accounts receivable, the ledger, the statement and either sales or cash receipts journal may be posted at one time. In recording accounts payable, a voucher check (or remittance statement and accounts payable ledger) may be posted simultaneously with either voucher register or check record.

The device is especially applicable in maintaining records of installment accounts since the ledger, the passbook or receipt and the collection register may be simultaneously posted. Similarly, when merchandise is sold on a lay-away plan, the customer's lay-away receipt, the store's lay-away ledger and the cash blotter may be written in one operation. Many other applications of the device may be made.

It is especially to be noted that in the embodiment herein described and illustrated in detail, as well as in the other uses of the device just mentioned, all writing by the operator is done in the same writing position for successive checks, receipts or similar forms. The individual operator can therefore locate the apparatus on a desk or table to best suit his own preference in order to minimize fatigue, and the position thus selected need not be changed from time to time during use.

Changes and modifications in the mechanical functioning of portions of the device will occur to those skilled in the art and all such modifications within the scope of the invention are embraced by the following claims.

I claim:

1. In an accounting apparatus the combination of: a base plate; a frictional roller mounted for rotation above said base plate and extending transversely thereof; a shaft supporting said transverse roller, a frictional idler roller selectively positionable in gripping relation with said transverse roller; means including a polygonal cross sectional portion on said shaft and a biased element urged against said portion for yieldingly urging said transverse roller into successive equally angularly spaced positions during manual rotation thereof whereby a first accounting form gripped between said frictional rollers is moved through successive equal pre-determined distances; and a spring-biased retainer cooperative with a marginal portion of one edge of said base plate for releasably clamping an end portion of second accounting forms overlying at least a portion of said first accounting form.

2. A combination as stated in claim 1 including means lying below an edge margin opposite to the retainer for selectively positioning a third accounting form, underlying at least a portion of said first and second accounting forms, at successive points longitudinal of said base plate spaced apart by said equal pre-determined distance.

3. A device for facilitating the making of simultaneous accounting entries on a plurality of different accounting forms comprising: a base plate having a flat, substantially unobstructed top surface; a carrier rod extending below one longitudinal edge margin of said base plate; a carrier selectively positionable at a plurality of equally spaced discrete points along said carrier rod and provided with upstanding positioning members projecting above the top surface of said plate for registration with a first accounting form; a cover plate pivotally mounted along a transverse edge of said base plate and normally overlying a transverse marginal portion of said base plate; a frictional roller carried by said base plate for rotation thereabove, and extending transversely thereof beneath said cover plate; a frictional idler roller carried by said cover plate for gripping relation with said transverse roller; means for yieldingly urging said transverse roller into successive equally angularly spaced positions during manual rotation thereof whereby a second accounting form gripped between said frictional rollers is moved through intervals correlated to the spacing of said discrete points on said carrier rod; a downwardly biased clamping means carried by the base plate at an intermediate portion of the other longitudinal edge margin, said clamping means being cooperative with the latter edge margin of said base plate for releasably holding a third accounting form, whereby a virtually unobstructed writing working area is provided below the cover plate for making entries on said accounting forms.

4. In an accounting apparatus, the combination of: a base plate; a cover plate pivotally mounted along a transverse edge of said base plate and normally overlying a transverse marginal portion of said base plate; a frictional roller carried by said base plate for rotation thereabove and extending transversely thereof beneath said cover plate; a frictional idler roller carried by said cover plate for gripping relation with said transverse roller; means for yieldingly urging said transverse roller into successive equally angularly spaced positions during manual rotation thereof whereby a first accounting form gripped between said frictional rollers is moved through successive equal predetermined distances; and a spring biased retainer cooperative with said base plate for releasably clamping an end portion of second accounting forms overlying at least a portion of said first accounting form.

5. A combination as stated in claim 4 including means lying below said base plate for selectively positioning a third accounting form, underlying at least a portion of said first and second accounting forms, at successive points longitudinal of said base plate spaced apart by said equal predetermined distance.

6. A combination as stated in claim 4 including a carrier rod below said base plate, supported thereby and extending longitudinally thereof, and a carrier selectively positionable at a plurality of equally spaced discrete points along said carrier rod and provided with upstanding positioning members projecting above the top surface of said plate for registration with a third accounting form.

JAMES C. NELSON.

REFERENCES CITED

The following references are of record in the file of this patent:

UNITED STATES PATENTS

| Number | Name | Date |
| --- | --- | --- |
| 971,725 | Brunson | Oct. 4, 1910 |
| 2,163,193 | Critchfield | June 20, 1939 |
| 2,198,580 | McNabb | Apr. 23, 1940 |
| 2,301,482 | Uhl | Nov. 10, 1942 |
| 2,344,453 | Payne | Mar. 14, 1944 |
| 2,485,513 | Straus | Oct. 18, 1949 |
| 2,524,128 | Jones | Oct. 3, 1950 |